United States Patent [19]
Young

[11] 3,866,218
[45] Feb. 11, 1975

[54] SCANNING RADAR AZIMUTH POSITION CONTROL SYSTEM

[75] Inventor: David W. Young, N. Hollywood, Calif.

[73] Assignee: Lear Siegler, Inc., Santa Monica, Calif.

[22] Filed: Aug. 16, 1973

[21] Appl. No.: 388,748

[52] U.S. Cl. ............... 343/5 LS, 343/5 ST, 343/17
[51] Int. Cl. .............................................. G01s 7/20
[58] Field of Search .... 343/5 LS, 5 SC, 5 MM, 5 R, 343/5 ST, 6 TV, 17

[56] References Cited
UNITED STATES PATENTS

| | | | |
|---|---|---|---|
| 3,553,690 | 1/1971 | Spangler | 343/6 TV |
| 3,653,044 | 3/1972 | Breeze et al. | 343/5 SC |
| 3,716,860 | 2/1973 | Bechtel | 343/5 SC |
| 3,755,812 | 8/1973 | Bechtel et al. | 343/5 MM |

Primary Examiner—T. H. Tubbesing
Assistant Examiner—G. E. Montone
Attorney, Agent, or Firm—Pastoriza & Kelly

[57] ABSTRACT

An adjustable phase shifter is connected between a radar scanning beam position sensor which provides an output wave form in accord with the azimuth position of a radar beam and the horizontal input of a cathode ray tube display for the radar. Deviations between the phase of the wave form passed to the display tube and the actual azimuth position can thus be corrected to avoid double images on the display screen which results if there exists any out of phase relationships between the output signal passed to the cathode ray tube display and the actual position of the scanning beam.

2 Claims, 3 Drawing Figures

PATENTED FEB 11 1975　　3,866,218

SCANNING RADAR AZIMUTH POSITION CONTROL SYSTEM

This invention relates generally to scanning radar systems and more particularly to an improved system for enabling adjustment of the azimuth position of targets displayed on the radar display screen.

BACKGROUND OF THE INVENTION

In my co-pending patent applications identified as follows:

| Title | Serial Number | Filing Date |
|---|---|---|
| AIRCRAFT CONTAINED PERSPECTIVE RADAR/DISPLAY AND GUIDANCE FOR APPROACH AND LANDING | 847,121 | August 4, 1969 now U.S. Pat. No. 3,778,821 issued Dec. 11, 1973. |
| PERSPECTIVE RADAR AIRPORT RECOGNITION AND LANDING GUIDANCE SYSTEM | 385,534 | August 3, 1974 |
| RIDGE SCAN ANTENNA | 353,201 | April 20, 1973 now U.S. Pat. No. 3,829,862 issued Aug. 13, 1974. | there are shown and described perspective radar systems utilizing a radar beam which is fan-shaped in a vertical plane and arranged to sweep in azimuth back and forth to result in a perspective radar display. The first listed above application deals in substantial detail with the perspective radar system itself while the second concerns certain improvements utilizing the perspective radar. The third application relates specifically to wave guide type antennas which may be used with either of the systems described in the first two applications.

In the RIDGE SCAN ANTENNA case there is disclosed a specific means for scanning the fan-shaped beam back and forth in azimuth. More specifically, an elongated ridge member is moved in a direction parallel to itself into and out of a side of a wave guide thereby changing the phase velocity of energy passing down the guide to in effect cause a scanning of the resultant output beam in azimuth. The ridge member itself is driven by a yoke wherein circular motion from a suitable D-C drive motor is converted to rectilinear back and forth motion. The beam thus scans essentially sinusoidally.

In order to display the echo signals on a display screen, the antenna beam position is detected by a suitable sensor means which generates a sine wave representing the sinusoidal motion of the beam itself. This sine wave is then passed to the horizontal input of the cathode ray tube so that the vertically sweeping beam is moved back and forth across the screen in a horizontal direction representing in azimuth the actual azimuth direction of the antenna beam.

The generation of the output signal representing the azimuth position of the beam can be accomplished by sensing the position of the ridge member in the event a ridge type scan antenna is used. In other types of mechanical scanning systems, for example, wherein the entire antenna is oscillated back and forth rapidly, the output signal may be derived from a similar pickup or sensor responsive to the physical motion of the antenna.

Since the actual antenna beam sweeps across from left to right and thence from right to left in a back and forth oscillatory manner, it is extremely important that the generated output signal or wave form representing the antenna beam motion be in exact phase in order that the targets will appear on the display screen in their proper azimuth positions. If there is any phase shift between the actual antenna position and the generated output signal representing this position, there will result double images on the display screen. One such image is generated when the beam sweeps in one direction as from left to right and the other image results when the beam sweeps back from right to left, the displaced images occuring because of the out of phase relationship of the horizontal input to the cathode ray display tube and the actual azimuth position of the beam.

BRIEF DESCRIPTION OF THE PRESENT INVENTION

With the foregoing considerations in mind, the present invention contemplates the provision of additional circuitry enabling control of the azimuth position of echo signals displayed on the cathode ray tube screen.

More particularly considering a scanning radar system generating a beam together with antenna drive means for sweeping the beam back and forth through a given azimuth angle and a beam position sensor means responsive to the azimuth angle of the beam to provide a cyclic output signal which oscillates in time at the same frequency as the beam oscillates back and forth in azimuth through said azimuth angle, the invention provides a phase shift means connected between the output of the beam position sensor means and the horizontal input to the cathode ray tube display screen to enable shifting of the phase of the cyclic signal, the phase shift means including adjusting means for controlling the degree of phase shift of the cyclic signal.

With the foregoing arrangement, the horizontal position of echo signals displayed on the display screen can be repositioned by operating the adjusting means to shift the phase of the cyclic wave form an amount to correct any phase shift between the output of the beam position sensor means and the actual azimuth position of the beam as a consequence of errors occuring in conversion by the beam position sensor means of the actual azimuth position of the beam and the generation of the cyclic wave form representing the actual position.

The invention may advantageously be used with a perspective radar system wherein the generated beam is fan-shaped in a vertical plane, but the principles are applicable to any scanning system wherein the beam is scanned back and forth through a given sector.

BRIEF DESCRIPTION OF THE DRAWINGS

A better understanding of the invention will be had by now referring to a preferred embodiment thereof as illustrated in the accompanying drawings in which.

DETAILED DESCRIPTION OF THE PREFERRED EMBODIMENT

Figure 1:
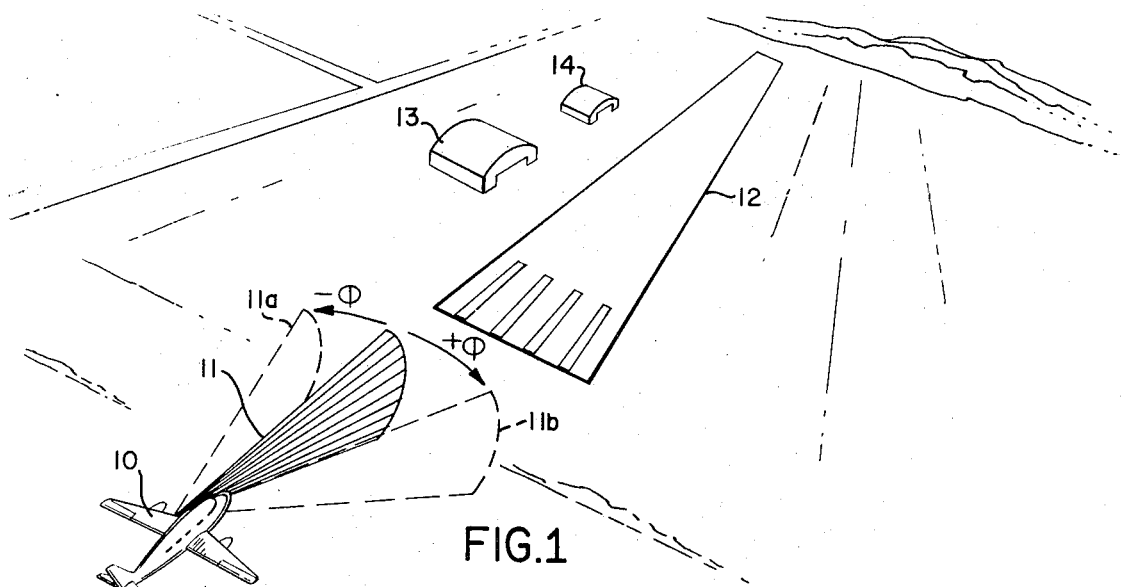
FIG. 1 is a perspective view of an airport complex showing an aircraft approaching for a landing wherein the aircraft incorporates a perspective radar system.

Referring first to FIG. 1 there is shown an aircraft 10 equipped with perspective radar which generates a beam 11 fan-shaped in a vertical plane. As indicated by the dashed lines, the fan-shaped beam 11 is arranged to be scanned or swept in azimuth through an angle Φ on either side of a directly forward position as shown at 11a and 11b. The scanning beam will thus detect various targets at the airport complex such as an outline of the runway 12 and buildings 13 and 14.

Figure 2:
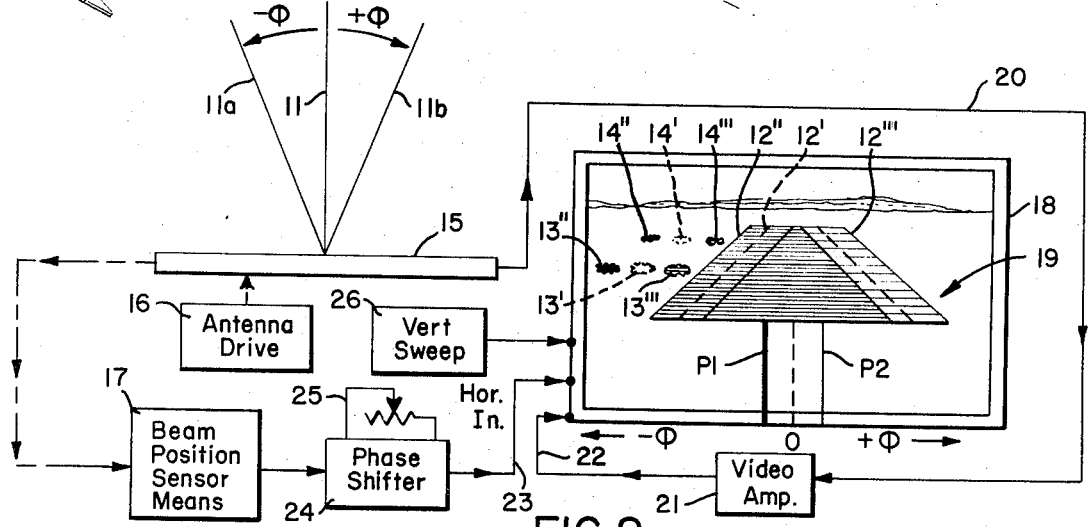
FIG. 2 is a block diagram in conjunction with the display screen of the perspective radar incorporated within the aircraft of FIG. 1.

Referring now to FIG. 2, there is schematically illustrated at 15 a wave guide antenna which may be a ridge scanning antenna such as shown and described in my heretofore referred to co-pending application entitled RIDGE SCAN ANTENNA. The view of the antenna of FIG. 2 is a top plan view and it will be noted that the generated beam 11 sweeps back and forth between the positions 11a and 11b as described in FIG. 1.

As shown in the left portion of FIG. 2, a suitable antenna drive 16 which in the case of the RIDGE SCAN ANTENNA would be a D-C motor connected to move the scanning ridge into and out of the wave guide, causes the beam 11 to oscillate back and forth. In the event the entire antenna itself is moved to effect a scanning, the antenna drive 16 would simply oscillate the antenna 15 about a vertical axis to effect the scanning described.

The system further includes a beam position sensor means 17 which may constitute any suitable type of pick-up or detector which senses the position of the beam 11 as a function of time and generates a corresponding electrical output signal. For example, if the beam 11 is scanned back and forth sinusoidally, the output signal from the beam position sensor means 17 would be a sine wave.

Referring now to the upper right portion of FIG. 2, there is indicated a cathode ray tube 18 including a radar display screen 19. Received echo signals from the antenna 15 pass along a video line 20 through video amplifier 21 to a video input 22 in the cathode ray tube 18. A horizontal input is shown at 23 and normally receives signals directly from the beam position sensor means 17. However, in accord with the present invention, there is provided a phase shifter 24 to enable the phase of the cyclic wave form from the beam position sensor means 17 to be shifted prior to reception on the horizontal input 23. The degree of phase shifting by the phase shifter 24 can be adjusted as by a potentiometer 25. The vertical sweep control for the cathode ray tube is indicated at 26.

OPERATION

Figure 3:
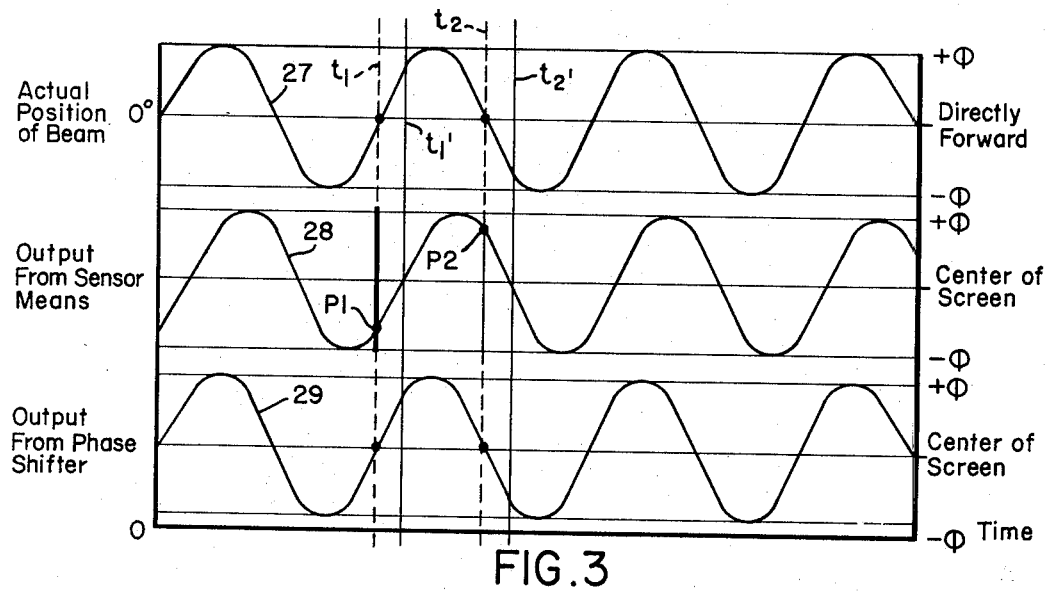
FIG. 3 illustrates a series of wave forms useful in explaining the operation of the invention.

The operation of the present invention can best be understood by now referring to FIG. 3 illustrating sine wave output signals 27, 28, and 29 respectively.

The output sine wave 27 shown on the top of the diagram of FIG. 3 represents the actual position of the beam 11 in azimuth which position varies between + and −Φ.

When the beam is directed exactly forwardly, the sine wave 27 is crossing the zero axis which axis is indicated as zero degrees.

The sine wave 28 represents the output from the sensor means 17 and in the particular example shown it will be noted that this sine wave is slightly out of phase with the sine wave 27. Such out of phase relationships can arise from a variety of sources such as poor mechanical tolerances in the actual scanning operation and/or errors in the conversion of the detected signal into an appropriate sine wave representing the position of the antenna beam. It should be understood that an out of phase relationship does not necessarily always exist. The present invention is only concerned with correcting such an out of phase relationship and the consequences thereof should errors in the system result in the undesired phase shifting.

With reference now to the display screen 19, consider first the situation where the output from the sensor means in the form of the sine wave 28 is exactly in phase with the actual position of the beam as indicated by the sine wave 27. In this case, the echo signals representing the targets such as the runway outline 12 and the buildings 13 and 14 are shown on the display screen in dashed lines as at 12', 13', and 14'. The positions shown on the screen are precisely correct in azimuth in that they correspond precisely to the azimuth position of the beam.

Consider now that a phase shift has occured as a consequence of error so that the sine wave 28 represents the output signal fed to the horizontal input of the display. With particular reference to the sine wave 28 in FIG. 3, it will be noted that at the point in time t1 when the sine wave curve 27 is crossing zero, the sine wave curve 28 has a value below the cross over line as indicated at the point P1. As a result the various targets which are correctly generated at the cross over time of the sine wave curve 27 at t1 at the center of the screen will now appear sooner because of the displacement of the point P1 and the targets thus appear as the darker signals indicated at 12'', 13'', and 14'''.

After the beam has swept completely from left to right, it will then start to sweep back from right to left and when it crosses the zero degree or cross over point indicated by the dashed line t2 in FIG. 3, because of the out of phase relationship of the sine wave 28, the targets will be reproduced at an azimuth position on the screen corresponding to the point P2. These positions are indicated on the display 19 at 12''', 13''', and 14'''.

It will thus be clear from the foregoing that double images result when the wave form passed to the display screen is out of phase with the wave form representing the actual position of the radar beam.

If now, the phase shifter 24 is operated to shift the sine wave 28 back in phase to a position such as indicated by the sine wave 29 so that it is in exact phase with the sine wave 27, the foregoing double images will disappear. Thus, it will be evident that at the cross over point of the sine wave 27 across the zero degree or directly forward axis, the wave form passed to the display indicated by the sine wave 29 also is passing the direct forward position corresponding to the center of the screen. Thus, the phase shifter 24 simply functions to position the point P1 and P2 at the proper cross over points on the center of the screen so that there will only appear the correct images as indicated by the dashed lines in FIG. 2.

In actual practice, the pilot observing the radar screen in his aircraft would simply manually adjust the potentiometer 25 to bring any double appearing images into coincidence with each other. Should further errors accumulate over a long period of time, the pilot can always readjust slightly the degree of phase with the potentiometer 25.

From the foregoing description, it will thus be evident that the present invention has provided improved scanning radar azimuth position control circuitry which avoids problems of double images and the like which can readily result in scanning antenna systems wherein a beam is swept back and forth in an oscillatory manner.

What is claimed is:

1. A scanning radar azimuth position control system comprising, in combination:
   a. a scanning radar system including an antenna for generating a beam;
   b. an antenna drive means for sweeping said beam back and forth through a given azimuth angle;
   c. a beam position sensor means responsive to the azimuth angle of said beam to provide a cyclic output signal which oscillates in time at the same frequency as the beam oscillates back and forth in azimuth through said azimuth angle;
   d. a radar cathode ray tube including a display screen and having a video input for receiving echo signals from said antenna and an horizontal input for receiving said cyclic signal so that said echo signals are displayed as images in first and second horizontal positions respectively generated when the beam is swept through said azimuth angle in one direction and swept back through said azimuth angle in an opposite direction as represented by said cyclic signal; and
   e. phase shift means connected between the output of said beam position sensor means and said horizontal input to enable shifting of the phase of said cyclic signal, said phase shift means including adjusting means for controlling the degree of phase shift of said cyclic signal, whereby the image of said first horizontal position of echo signals displayed on said display screen can be repositioned relative to the image of said second horizontal position by said adjusting means to shift the phase of the cyclic wave form passed to said horizontal input an amount to correct any phase shift between the output of said beam position sensor means and the actual azimuth position of said beam as a consequence of errors occurring in conversion by said beam position sensor means of the actual position of the beam and the generation of the cyclic wave form representing said actual position to thereby cause said first and second horizontal positions to coincide and thereby avoid double images.

2. A system according to claim 1, in which said scanning radar is a perspective radar system, said beam is fan-shaped in a vertical plane, and said cyclic wave form is a sine wave.

* * * * *